United States Patent
Lessing et al.

(10) Patent No.: US 10,828,788 B2
(45) Date of Patent: Nov. 10, 2020

(54) DISTRIBUTED PRESSURIZATION AND EXHAUST SYSTEMS FOR SOFT ROBOTS

(71) Applicant: President and Fellows of Harvard College, Cambridge, MA (US)

(72) Inventors: Joshua Aaron Lessing, Cambridge, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 284 days.

(21) Appl. No.: 15/744,536

(22) PCT Filed: Jul. 12, 2016

(86) PCT No.: PCT/US2016/041858
§ 371 (c)(1),
(2) Date: Jan. 12, 2018

(87) PCT Pub. No.: WO2017/011438
PCT Pub. Date: Jan. 19, 2017

(65) Prior Publication Data
US 2018/0207814 A1    Jul. 26, 2018

Related U.S. Application Data

(60) Provisional application No. 62/191,657, filed on Jul. 13, 2015.

(51) Int. Cl.
*B25J 9/14*    (2006.01)
*B25J 18/06*    (2006.01)
(Continued)

(52) U.S. Cl.
CPC ............... *B25J 18/06* (2013.01); *B25J 9/142* (2013.01); *F15B 15/103* (2013.01); *B25J 15/0023* (2013.01); *B25J 15/12* (2013.01)

(58) Field of Classification Search
CPC ........ B25J 9/142; B25J 18/06; B25J 15/0023; F15B 15/103
See application file for complete search history.

(56) References Cited

U.S. PATENT DOCUMENTS 3,284,964 A * 11/1966 Saito ..................... B25J 18/06
                                                          52/2.22
4,433,953 A * 2/1984 Muench ................. B25J 18/06
                                                            101/44

(Continued)

FOREIGN PATENT DOCUMENTS

| CN | 101622107 A | 1/2010 |
| CN | 102579158 A | 7/2012 |

(Continued)

OTHER PUBLICATIONS

Hamlen, R. P., et al., "Electrolytically Activated Contractile Polymer," Nature, vol. 206, No. 4989, pp. 1149-1150 (Jun. 12, 1965).

(Continued)

*Primary Examiner* — William Kelleher
*Assistant Examiner* — Gregory T Prather
(74) *Attorney, Agent, or Firm* — Wilmer Cutler Pickering Hale and Dorr LLP

(57) ABSTRACT

A soft robot is described, including: a flexible and/or stretchable body; a common fluid pressurization unit; and a plurality of fluid chambers each embedded in the flexible and/or stretchable body and capable of fluidic connection with the common fluid pressurization unit through a pressurizing valve; wherein the pressurizing valve is capable of being activated to allow the pressurized fluid to flow from the common fluid pressurization unit into the fluid chamber to result in actuation. Methods of using the soft robot are also described.

44 Claims, 6 Drawing Sheets

(51) Int. Cl.
*F15B 15/10* (2006.01)
*B25J 15/00* (2006.01)
*B25J 15/12* (2006.01)

(56) References Cited

U.S. PATENT DOCUMENTS

| | | | | |
|---|---|---|---|---|
| 4,784,042 | A * | 11/1988 | Paynter | B25J 9/142 414/7 |
| 4,826,087 | A * | 5/1989 | Chinery | B25J 9/14 239/551 |
| 4,900,218 | A * | 2/1990 | Sutherland | B25J 18/06 254/93 HP |
| 5,181,452 | A * | 1/1993 | Immega | B25J 9/104 91/418 |
| 5,337,732 | A * | 8/1994 | Grundfest | A61B 1/00082 600/116 |
| 6,178,872 | B1 | 1/2001 | Schulz | |
| 9,962,832 | B2 * | 5/2018 | Kwok | B25J 9/142 |
| 2002/0157388 | A1 * | 10/2002 | Seto | F15B 15/18 60/325 |
| 2005/0029368 | A1 * | 2/2005 | Giulano | B05B 12/1409 239/548 |
| 2009/0182436 | A1 * | 7/2009 | Ferrara | A63B 21/00178 623/57 |
| 2012/0210818 | A1 | 8/2012 | Fischer et al. | |
| 2013/0091974 | A1 * | 4/2013 | Riwan | B25J 18/06 74/490.04 |
| 2014/0109560 | A1 * | 4/2014 | Ilievski | B25J 9/142 60/327 |
| 2014/0208731 | A1 * | 7/2014 | Shepherd | F15B 13/04 60/327 |
| 2015/0266186 | A1 * | 9/2015 | Mosadegh | B25J 9/142 92/34 |
| 2016/0052131 | A1 * | 2/2016 | Lessing | B25J 15/0009 361/679.01 |
| 2016/0114482 | A1 * | 4/2016 | Lessing | B25J 15/12 606/130 |
| 2016/0279803 | A1 * | 9/2016 | Lessing | B32B 5/18 |

FOREIGN PATENT DOCUMENTS

| | | |
|---|---|---|
| WO | WO-2013/110086 A1 | 7/2013 |
| WO | WO-2013103412 A2 | 7/2013 |
| WO | WO-2013/148340 A2 | 10/2013 |
| WO | WO-2014/066378 A2 | 5/2014 |
| WO | WO-2014/179864 A1 | 11/2014 |

OTHER PUBLICATIONS

International Search Report issued by the U.S. Patent and Trademark Office as International Searching Authority for International Application No. PCT/US2016/041858 dated Oct. 13, 2016 (3 pages).

Kuhn, W. and Hargitay, B., "Reversible Dilation and Contraction by Changing the State of Ionization of High-Polymer Acid Networks," Nature, vol. 165, No. 4196, pp. 514-516 (Apr. 1, 1950).

Martinez, R. V., et al., "Robotic Tentacles with Three-Dimensional Mobility Based on Flexible Elastomers," Advanced Materials, vol. 25, pp. 205-212 (Jan. 2013).

Otake, M., et al., "Motion design of a starfish-shaped gel robot made of electro-active polymer gel," Robotics and Autonomous Systems, vol. 40, No. 2-3, pp. 185-191 (Aug. 2002).

Shepherd, R. F., et al., "Multigait soft robot," PNAS, vol. 108, No. 51, pp. 20400-20403 (Dec. 20, 2011).

Sugiyama, Y. and Hirai, S., "Crawling and Jumping by a Deformable Robot," The International Journal of Robotics Research, vol. 25, No. 5-6, pp. 603-620 (Jun. 2006).

Suzumori, Kohichi, "Flexible Microactuator (1st Report, Static Characteristics of 3 DOF Actuator)," Trans. JSME, vol. C55, No. 88-1595, pp. 2547-2552 (Oct. 1989).

* cited by examiner

DISTRIBUTED PRESSURIZATION AND EXHAUST SYSTEMS FOR SOFT ROBOTS

RELATED APPLICATION

This application is a national stage entry of PCT/US16/41858 filed Jul. 12, 2016, which claims the benefit and priority of U.S. Provisional application 62/191,657, filed Jul. 13, 2015, the entire contents of which are incorporated by reference.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

Many approaches to robots that resemble animals with skeletons are being actively developed. Most of these robots are constructed using so-called "hard" body plans; that is, a rigid (usually metal) skeleton, electrical or hydraulic actuation, electromechanical control, sensing, and feedback. Examples include Boston Dynamics Big Dog and Boston Dynamics Atlas.

Another class of robots—those based on animals without skeletons—are much less explored, for a number of reasons: i) there is a supposition that "marine-like" organisms (squid) will not operate without the buoyant support of water; ii) the materials and components necessary to make these systems are often not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. The field of soft robotic actuation began with work by Kuhn et al. in 1950. Their work focused on the reversible change in the coiling and uncoiling of a polymeric material dependent on the pH of the surrounding medium. They used this to successfully raise and lower a weight, thus showing proof of principle for the use of soft materials in robotic actuation. Hamlen et al. expanded upon this idea in 1965 and showed that polymeric materials can be made to contract electrolytically. These two developments set the scene for future work using the swelling of polymeric gels and electronic control of dielectric-based actuators. Otake et al. have demonstrated the use of electro-active polymers in the manufacture of starfish-shaped robotic actuators. Pneumatically-driven soft actuators based on pressurization of sealed chambers fabricated from extensible polymers were first reported by Suzumori et al. in 1989 (Suzumori et al., (1989), "Flexible microactuator, (1st Report, Static characteristics of 3 DOF actuator)", Trans. JSME, C55, 2547-2552). This type of actuation has been used on the millimeter scale to fabricate grippers, tentacles, and other related devices including pneumatic balloons.

Pneumatic soft robotic actuators can be manufactured using inextensible materials, which rely on architectures such as bellows. McKibben actuators, also known as pneumatic artificial muscles (PAMs), rely on the inflation of a bladder constrained within a woven sheath which is inextensible in the axis of actuation. The resultant deformation may lead to radial expansion and/or axial contraction. Specifically, depending on the angle of the fibers in the woven sheath the actuator can be made to contract or extend upon pressurization. The force that can be applied is proportional to the applied pressure. Related actuators are called pleated pneumatic artificial muscles.

There are "soft" robotic actuators such as shape memory alloys which have been used by Sugiyama et al. both as the actuation method and as the main structural component in robots which can both crawl and jump. Another approach, which can be described as "soft" uses a combination of traditional robotic elements (an electric motor) and soft polymeric linkages based on Shape Deposition Manufacturing (SDM). This technique is a combination of 3D printing and milling. An example of a composite of traditional robotics with soft elements has been used with great success in developing robotic grippers comprising soft fingers to improve the speed and efficiency of soft fruit packing in New Zealand. Additional capabilities for soft robotics are desired.

In conventional soft robotic systems, the actuation chambers of the robot are usually connected to a pneumatic or hydraulic control unit via a series of long and narrow tubes. This can result in tangles of tubes and heavier, more cumbersome robots. Thus, new designs of soft robots are desired.

SUMMARY

Described herein are distributed pressurization and exhaust systems for soft robots and soft robots containing the distributed pressurization and exhaust systems of the same. In certain embodiments, the distributed pressurization and exhaust system may include a common fluid pressurization unit embedded in the flexible and/or stretchable body; and a plurality of fluid chambers each embedded in the flexible body and capable of fluidic connection with the common fluid pressurization unit through a valve or series of valves; wherein the valve or series of valves is capable of being activated allowing either the pressurized fluid to flow from the common fluid pressurization unit into the fluid chamber to result in actuation or optionally out of the fluid chamber to an exhaust unit to result in deactivation.

In one aspect, a soft robot is described, including:
- a flexible and/or stretchable body;
- a common fluid pressurization unit; and
- a plurality of fluid chambers each embedded in the flexible and/or stretchable body in fluidic connection with the common fluid pressurization unit through a pressurizing valve;
- wherein the pressurizing valve is configured for activation by flow of the pressurized fluid from the common fluid pressurization unit into the fluid chamber to result in actuation.

In any one of the embodiments described herein, the common fluid pressurization unit is embedded in the flexible and/or stretchable body.

In any one of the embodiments described herein, the common fluid pressurization unit is a common fluid pressurization channel.

In any one of the embodiments described herein, the common fluid pressurization unit is a common fluid pressurization chamber.

In any one of the embodiments described herein, the pressurizing valve is connected to the common fluid pressurization unit via a connection tube.

In any one of the embodiments described herein, the common fluid pressurization unit is configured to be in fluidic connection with a pressurized fluid source.

In any one of the embodiments described herein, the common fluid pressurization unit is configured to be connected to a vacuum source.

In any one of the embodiments described herein, the common fluid pressurization unit is configured to maintain a positive or negative pressure compared with atmosphere for a predetermined time.

In any one of the embodiments described herein, the soft robot further includes a common fluid exhaust unit and each of the fluid chambers is capable of being in fluidic connection with the common fluid exhaust unit through an exhaust valve.

In any one of the embodiments described herein, the common fluid exhaust unit is a common fluid exhaust channel or a common fluid exhaust chamber.

In any one of the embodiments described herein, one or more fluid chambers further each comprise an exhaust valve and an exhaust channel; and the fluid chamber is configured to be in fluidic connection with the outside environment through the exhaust valve and exhaust channel.

In any one of the embodiments described herein, the common fluid pressurization unit is an accumulating chamber capable of being in fluidic connection with the plurality of fluidic chambers through the pressurizing valves.

In any one of the embodiments described herein, the accumulating chamber is stiff, flexible, or stretchable.

In any one of the embodiments described herein, the accumulating chamber is configured to hold a pressurized fluid to be filled into the fluid chambers and/or to exhaust the pressurized fluid from the fluid chambers.

In any one of the embodiments described herein, the accumulating chamber is an accumulator in fluidic communication with the pressurizing valves.

In any one of the embodiments described herein, the accumulating chamber is an accumulator attached to or embedded in the flexible and/or stretchable body.

In any one of the embodiments described herein, the soft robot further includes one or more communication wires connected to one or more of the pressurization valves to control the valves collectively or individually.

In any one of the embodiments described herein, the wire is conventional wire or lithographically deposited wire.

In any one of the embodiments described herein, one or more of the pressurization valves are linked with a microcontroller connected to one or more communication wires.

In any one of the embodiments described herein, the one or more wires are connected to one or more of the pressurization valves to perform valve control via a communication bus.

In any one of the embodiments described herein, the soft robot further includes one or more fiber optic cables each connected to one or more of the pressurization valves and configured to perform valve control.

In any one of the embodiments described herein, the soft robot further includes one or more fiber optic cables each connected to one or more of the pressurization valves and configured to perform valve control via a communication bus.

In any one of the embodiments described herein, one or more of the pressurization valves each comprise an electric system configured to allow a user to control the pressurization valves wirelessly.

In any one of the embodiments described herein, the soft robot further includes an optically-triggered transistor or an acoustically-triggered transistor configured to control the operation of one or more of the pressurization valves.

In any one of the embodiments described herein, the soft robot further includes one or more piezoelectric transducers to transmit signal to control the pressurization valves.

In any one of the embodiments described herein, the action of the pressurizing valve can be driven by a pilot valve. In these embodiments, the pressurizing valve can be referred to as a main valve. In any one of the embodiments described herein, the soft robot further includes one or more pilot valve(s) each in fluidic connection with the main valve(s) and configured to actuate the main valve(s). In any one of the embodiments described herein, the soft robot includes a first accumulating chamber fluidically connected to the main valve(s) and a second accumulating chamber fluidically connected to the pilot valve(s). In any one of the embodiments described herein, the main valve is configured to operate at a first pressure; and the pilot valve is configured to operate at a second pressure higher than the first pressure.

In any one of the embodiments described herein, the first accumulator is fluidically connected via a regulator and a valve to the second accumulator. In any one of the embodiments described herein, the first and/or second accumulating chambers are connected to the main valve and the pilot valve, respectively, through a regulator and a valve. In any one of the embodiments described herein, the first accumulating chamber comprises fluid with a pressure higher than the fluid in the fluid chamber.

In any one of the embodiments described herein, the flexible body comprises a strain limiting layer, wherein a tensile modulus of the strain limiting layer is higher than a tensile modulus of the flexible and/or stretchable body.

In any one of the embodiments described herein, the soft robot further includes a fluid reservoir and a fluid inlet.

In any one of the embodiments described herein, the soft robot further includes a fluid reservoir and a fluid inlet and wherein the fluid reservoir is configured to deliver fluid via the fluid inlet into the common fluid pressurization channel.

In any one of the embodiments described herein, the flexible and/or stretchable body is made from an elastomer.

In any one of the embodiments described herein, wherein the soft robot further comprises a pneumatic pump and/or vacuum pump.

In another aspect, a method of actuating a soft robot is described, including:
  providing a soft robot according to any one of the embodiments described herein;
  providing pressurized fluid in the common fluid pressurization unit; and
  activating one or more pressurizing valves to allow the pressurized fluid to flow from the common fluid pressurization unit into at least one of the fluid chambers to result in actuation.

In any one of the embodiments described herein, the method further includes removing fluid from the pressurizing unit.

In yet another aspect, a method of actuating a soft robot is described, including:
  providing a soft robot according to any one of the embodiments described herein;

removing fluid from the common fluid pressurization unit; and activating one or more pressurizing valves to remove the fluid from the fluid chamber to result in actuation.

In any one of the embodiments described herein, the method further includes transmitting acoustic signals to trigger the actuation.

In any one of the embodiments described herein, one or more pressurizing valves are configured to be opened by acoustic signals.

It is contemplated that any embodiment disclosed herein may be properly combined with any other embodiment disclosed herein. The combination of any two or more embodiments disclosed herein is expressly contemplated.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

It will be understood that the spatially relative terms, as well as the illustrated configurations, are intended to encompass different orientations of the apparatus in use or operation in addition to the orientations described herein and depicted in the figures. Spatially relative terms, such as "above," "below," "left," "right," "in front," "behind," and the like, may be used herein for ease of description to describe the relationship of one element to another element, as illustrated in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it may be directly linked to, on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

DESCRIPTION OF THE DRAWINGS

The invention is described with reference to the following figures, which are presented for the purpose of illustration only and are not intended to be limiting. In the Drawings:

FIG. 1A shows a tentacle with nine independent actuation chambers connected to nine narrow tubes. FIG. 1B shows a tentacle with three chambers inflated simultaneously. FIG. 1C shows a tentacle holding a flower by inflating three of its chambers allowing it to conform to the shape of the flower.

FIG. 2A shows the exterior view of a soft robotic tentacle including a series of actuation chambers embedded in a soft extensible elastomer that surrounds a stiffer strain limiting core. FIG. 2B shows the cross section view of the tentacle which shows the strain limiting core made up of both a stiff elastomer and the series of tubes used to supply and exhaust pressurized fluid from the actuation chambers.

FIG. 6A, right, shows a soft robot with a distributed pressurization and exhaust system including an accumulator, according to one or more embodiments described herein.

DETAILED DESCRIPTION

Figure 1A:
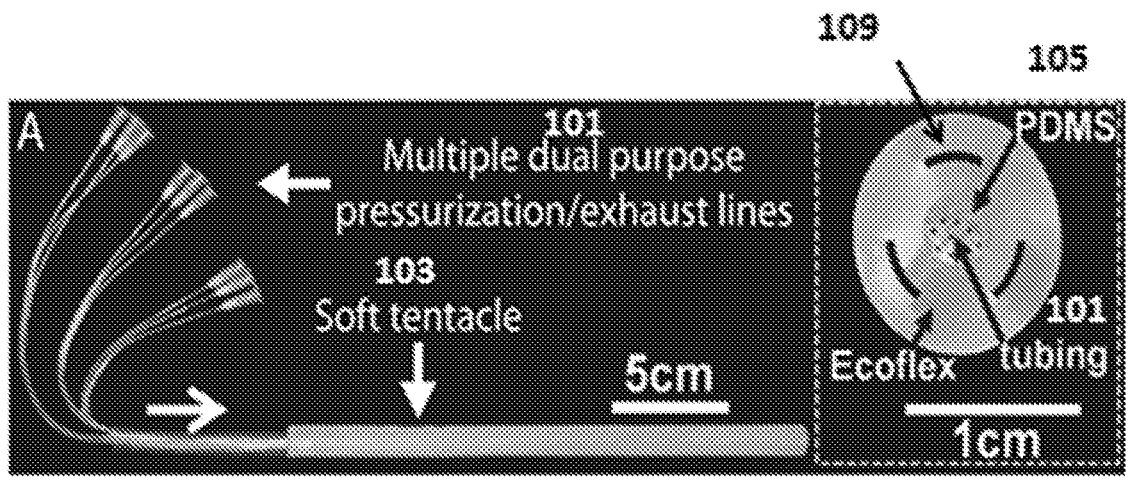
FIGS. 1A-1C show photos of a conventional soft tentacle (taken from Whitesides et al., Adv Mat, 25, 205-212, 2013). Specifically.
Figure 1B:
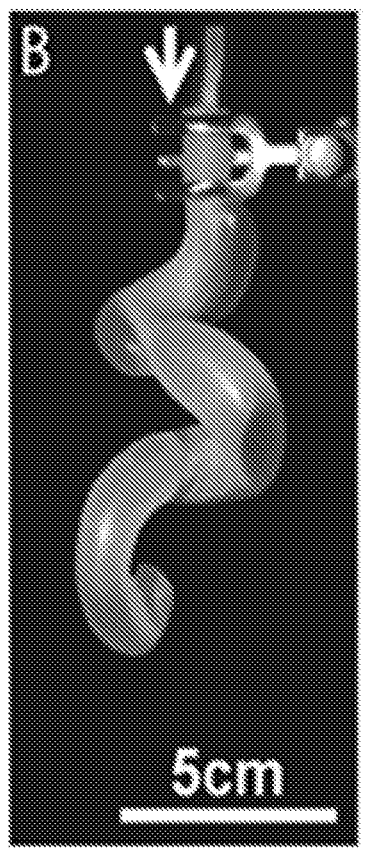
Figure 1C:
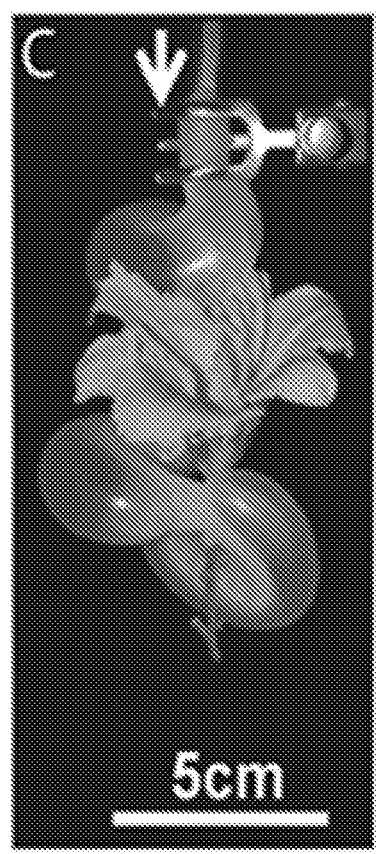

In conventional soft robotic systems the actuation chambers of the robot are connected to a pneumatic or hydraulic control unit via a series of long and narrow tubes. This control unit includes a source of pressurized fluid and a collection of valves that feeds this fluid to the tubes that supply the actuation chambers. Photos of a conventional soft tentacle (Whitesides et al., Adv Mat, 25, 205-212, 2013) are shown in FIGS. 1A-1C. Specifically, FIG. 1A shows a soft tentacle 103 with nine independent actuation chambers connected to nine narrow tubes, e.g., dual purpose pressurization/exhaust lines 101. During operation, each actuation chamber can be pressurized independently by the control system. The right side of FIG. 1A shows the cross section of the tentacle with the tubing traveling along a stiff PDMS core 105 and three of the nine actuation chambers 109 at the periphery of the tentacle with a soft body made from Ecoflex. FIG. 1B shows a tentacle with three chambers inflated simultaneously. FIG. 1C shows a tentacle holding a flower by inflating three of its chambers and allowing it to conform to the shape of the flower.

Figure 2A:
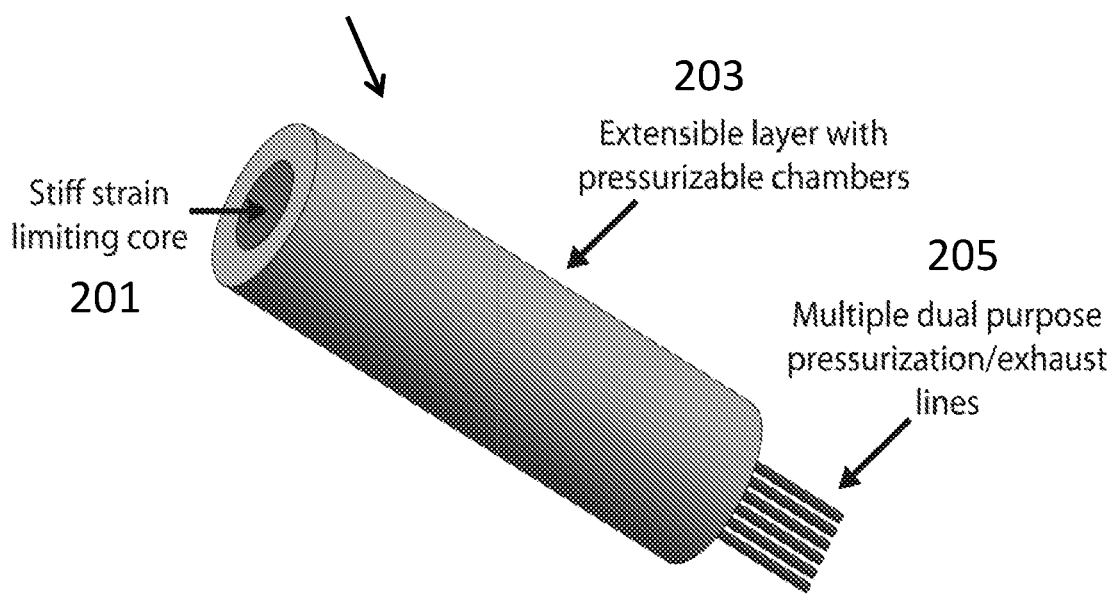
FIGS. 2A-2B show the construction of a typical tentacle. Specifically.
Figure 2B:
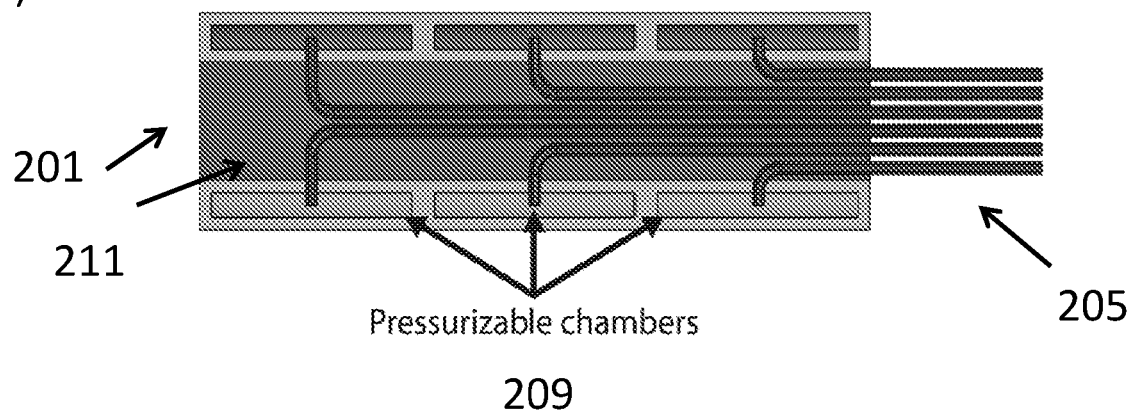

The construction of a typical, conventional tentacle is shown in FIGS. 2A-2B. Specifically, FIG. 2A shows a conventional soft robotic tentacle 207 including a series of actuation chambers (shows in FIG. 2B as 209) embedded in a soft extensible elastomer layer 203 that surrounds a strain limiting layer, e.g., a stiffer strain limiting core 201. A plurality of dual purpose pressurization/exhaust lines 205 are embedded in the strain limiting core 201. FIG. 2B shows that the strain limiting core 201 is made up of both a stiff elastomer 211 and the series of tubes 205 used to supply and exhaust pressurized fluid from the actuation chambers 209.

The conventional approach to tube routing described in FIGS. 2A-2B has three key draw backs: 1) it necessitates the addition of a tube for addressing each actuation chamber which in turn requires a large amount of the robot's weight to be devoted to tube routing; 2) since a large number of tubes need to fit into a limited volume on the robot, each tube is required to have a small diameter. This results in higher tubular resistance which slows the speed at which actuation can occur; and 3) the total number of independent actuation chambers in the soft robot is limited by the number of tubes that can fit into the volume of the core.

In one aspect, a soft robot is described, including: a flexible and/or stretchable body; a common fluid pressurization unit optionally embedded in the flexible and/or stretchable body; and a plurality of fluid chambers each embedded in the flexible and/or stretchable body and capable of fluidic connection with the common fluid pressurization unit and optionally an exhaust unit through a valve or series of valves; wherein the valve or series of valves is capable of being activated to move pressurized fluid from the common fluid pressurization unit into the fluid chamber to result in actuation or optionally to move fluid out of the fluid chamber to an exhaust unit thereby bringing the actuator back to its deactivated state. In certain embodiments, the soft robot further includes an exhaust line to remove the pressurized fluid from the fluid chambers. Methods of using the soft robot are also described.

In some embodiments, the common fluid pressurization unit is a common fluid pressurization channel or tube, which may be in fluidic communication with the plurality of fluid chambers through a distributed network of valves. In other embodiments, the common fluid pressurization unit is a common fluid pressurization chamber also known as a pressure accumulator, which may be in fluidic communication with the plurality of fluid chambers through a distributed network of valves.

In some embodiments, the soft robot's pressurizing valve comprises a main valve configured to operate at low pressure, e.g., 40, 30, 20, 10 psi or less. In certain embodiments, the soft robot further comprises one or more pilot valves each in fluidic connection with the main valve and designed to actuate the main valve. In these embodiments, the soft robot may comprise a first accumulating chamber fluidically connected to the main valve(s) and a second accumulating chamber fluidically connected to the pilot valve(s).

In some embodiments, the pilot valve is a valve that controls a feed to the main valve to actuate the main valve. The pilot valve is fluid-piloted, e.g., air-piloted. In certain embodiments, the main valve is configured to operate at a first pressure, e.g., a low pressure at 40, 30, 20, or 10 psi or less. In certain embodiments, the pilot valve is configured to operate at a second pressure, e.g., a high pressure at 50, 60, 70, 80, 90, 100 psi or more. In certain embodiments, the second pressure is higher than the first pressure. The pilot valves are useful because they allow one fluid feed to control another fluid feed. In certain specific embodiments, the pilot valve is a solenoid valve.

Thus, in these embodiments, the main valves are actuated indirectly by the pilot valves (usually smaller). When actuated, the pilot valve lets pressurized fluid, e.g., air, into a chamber that moves a mechanism in the main valve resulting in the main valve opening or closing. In certain embodiments, the soft robot comprises a first accumulating chamber, e.g., a first pressurized accumulator, in the body of the robot which is in fluidic communication with the main valve(s). In some embodiments, the soft robot also comprises a second accumulating chamber, e.g., a second pressurized accumulator, in the body of the robot which is in fluidic communication with the pilot valve(s). In some embodiments, the first accumulating chamber contains a low pressure (e.g., 10 psi) fluid with fluidic connections to the main valves to drive the motion of the soft actuators. The second pressure accumulating chamber may contain a high pressure (e.g., 80 psi) fluid with fluidic connections to the pilot valves for actuating the main valves. In some embodiments, to actuate the soft robot, an electrical signal is sent to the solenoid in the pilot valve causing the pilot valve to open. Next, air flows from the second higher pressure accumulator through the pilot valve to a mechanism in the main valve. Once this high pressure air has accumulated in the main valve, it will actuate the main valve causing the main valve to open. Next, air will flow from the first, low pressure accumulator through the main valve to the soft actuator where it will actuate the soft actuator.

In some embodiments, the soft robot comprises a second accumulating chamber containing a high pressure (e.g., more than 50, 60, 70, 80, 90 psi or more) fluid with fluidic connections to the pilot valves for actuating the main valves. In these embodiments, the first accumulator (which is used to store low pressure fluid, e.g., air, for actuating a soft actuator) may be fluidically connected via a regulator to the second accumulator. In this way, when the lower pressure first accumulator is being depleted of air, for example due to the actuation of a actuator, its air can be replenished by air from the second accumulator. Here the first and second accumulators are fluidically connected via a regulator so that the high pressure air of the second accumulator is converted into the lower pressure air needed by the first accumulator. Not wishing to be bound by any particular theory, it is believed that this approach has two key advantages:

1) the high pressure accumulator allows for a larger quantity of air to be stored locally near the actuators than is possible using only the first low pressure accumulator; and 2) a tethered soft robotic system that has an embedded second high pressure accumulator could be operated by using a narrower tether for supplying air to the robot. This is because we are flowing air to the robot at a higher pressure so the quantity of air being transmitted to the robot per unit of tether volume is higher as a result the tether does not need to be a large cross-section tube to cover the robots air needs it could now be a small cross-section tube. Note that in this version of the robot the tether is connected directly to the second high pressure accumulator and all air required for operating the robot is sourced from this high pressure accumulator.

In these embodiments, the second (higher pressure) accumulating chamber can still also be utilized to provide air to operate pilot valves. In this case the second high pressure accumulator would be in fluidic connection with the pilot valves of the robot as well as being fluidically connected via a regulator to the first accumulator which is at a lower pressure.

In some embodiments, the first and/or second accumulating chamber on the robot held fluid, e.g., air, with a much higher pressure (a first high pressure) than what is required to actuate an actuator and that this chamber/accumulator is in fluidic connection with an actuator via a combination of a regulator and a valve. In these embodiments, the first high pressure, e.g., air, would flow from the high pressure accumulator through a regulator which steps the pressure down to the pressure required for actuation, next the air goes through a valve and finally to the soft actuator for the sake of actuating the soft actuator. Not wishing to be bound by any particular theory, it is believed that this design would have the advantage of 1) allowing for more fluid storage in the body of the soft robot and 2) the robot, if tethered, would require a smaller tether.

In certain embodiments, the common fluid pressurization unit, e.g., the common fluid pressurization chamber, is configured to maintain a positive pressure (compared with the atmosphere pressure) for a predetermined time, so that one or more of the fluid chambers can be pressurized quickly without going through long channels to a pressurization source.

In certain embodiments, the common fluid pressurization unit, e.g., the common fluid pressurization chamber, is configured to maintain a negative pressure (compared with the atmosphere pressure) for a predetermined time, so that one or more of the fluid chambers can be depressurized quickly without going through long channels to a depressurization source.

In some embodiments, the soft robot further includes a common fluid vacuuming unit. In some embodiments, the common fluid vacuuming unit is a common fluid vacuuming channel or tube, which may be in fluidic communication with the plurality of fluid chambers through a distributed network of valves. In other embodiments, the common fluid vacuuming unit is a common fluid vacuuming chamber also known as a pressure accumulator, which may be in fluidic communication with the plurality of fluid chambers through a distributed network of valves.

In some embodiments, a distributed pressurization and exhaust system for soft robots is described, in which the valves that gate the supply of pressurized fluid or the exhaust of pressurized fluid are located at the inlet of each actuation chamber as opposed to being localized in a control unit. The features and advantages of this distributed pressurization and exhaust system for soft robots in one or more embodiments as compared to conventional systems are described with reference to FIGS. 3A-3B.

Figures 3A, 3B:
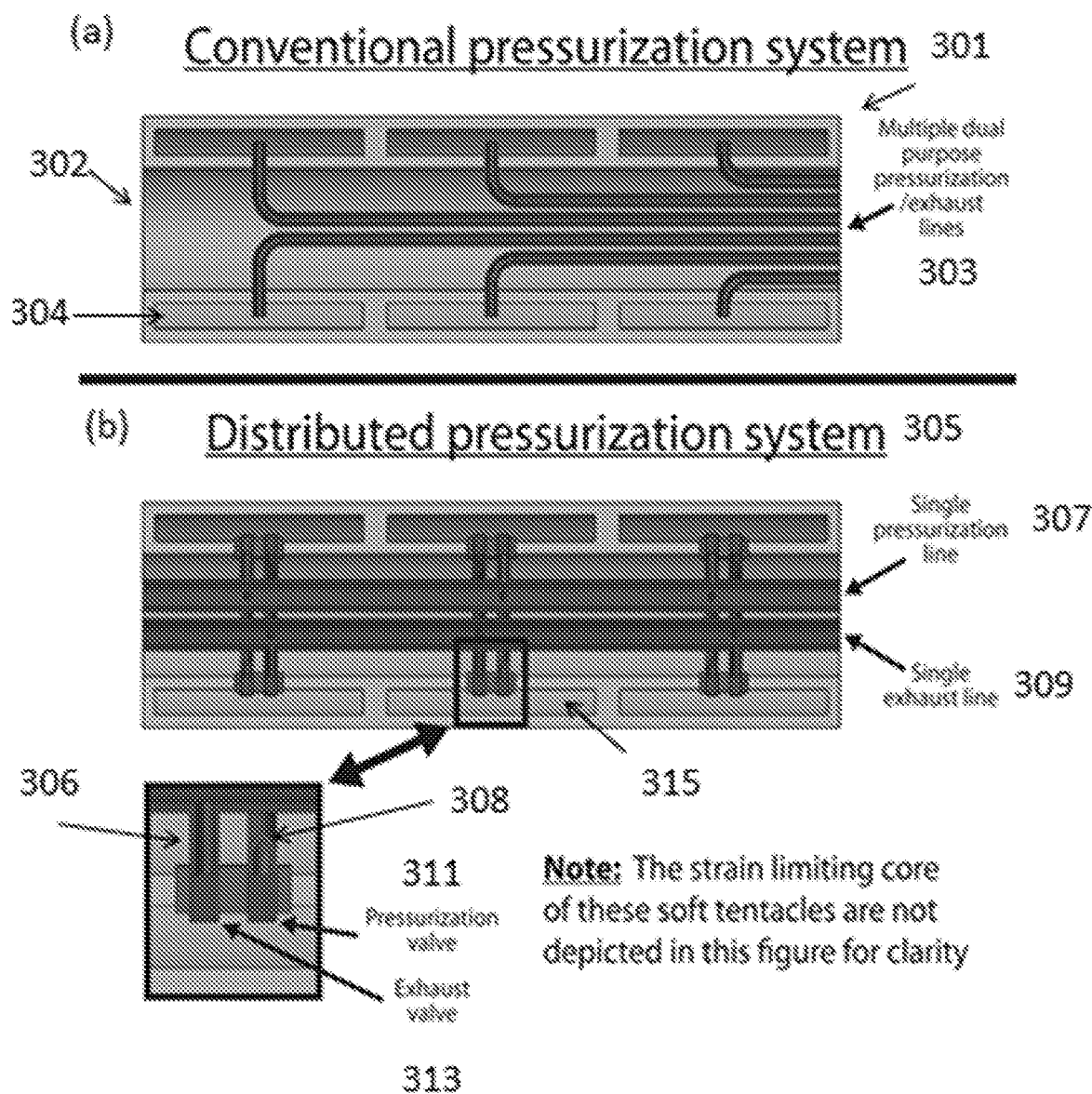
FIG. 3A shows a conventional pressurization and exhaust system in a soft actuator.
FIG. 3B shows a distributed pressurization and exhaust system, according to one or more embodiments described herein.

In some embodiments, the distributed pressurization and exhaust system as described herein is used for many forms of soft robots, including, but not limited to, soft robotic tentacles. Shown in FIG. 3A is a cross section of a soft robotic tentacle 301 that utilizes a conventional pressurization and exhaust system. Note that the elastomer used for the strain limiting core has been omitted for clarity for both tentacles shown in this figure. The volume of the core 302 is consumed by the tubes 303 required to individually address each actuation chamber 304. FIG. 3B shows a soft robotic tentacle that uses a distributed pressurization and exhaust system as described in one or more embodiments herein. Here, the tentacle 305 contains a common fluid pressurization channel, e.g., a single pressurization line 307, which is connected to each fluid chamber 315 through pressurization valve 311 and connection tube 308. The common fluid pressurization channel is configured to be in fluidic connection with a fluid reservoir/source to supply the pressurized fluid. In certain embodiments, the tentacle 305 optionally further includes a common fluid exhaust unit, e.g., a single exhaust line 309 for exhausting pressurized fluid, which is connected to the fluid chamber 315 through exhaust valve 313 and connection tube 306. Branching off of these large tubes are a series of tubes (e.g., connection tubes 306 and 308) that are connected via a series of valve assemblies (e.g., pressurizing valve such as 311 and vacuuming valve such as exhaust valve 313) to the individual actuation chambers 315. These valve assemblies can be triggered or activated in order to provide access to the pressurization line or the exhaust line.

Alternatively, in certain embodiments, the common fluid pressurization unit 307 is configured to be connected to a fluid vacuum and acts also as the common fluid exhaust unit.

In some embodiments, the flexible body comprises a strain limiting layer, wherein a tensile modulus of the strain limiting layer is higher than a tensile modulus of the flexible body. As used herein, the term "strain limited layer" and "strain limiting layer" are used interchangeably. Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience more strain or deformation. As a result, the strain in the material of higher stiffness or greater elastic modulus is smaller or "limited." As used herein, the layer or wall or portion thereof of the soft robot that extends, bends, expands or unfolds at lower threshold force is the 'extensible' or 'low strain' member. The layer or wall or portion thereof of the soft robot that extends, bends, expands or unfolds at higher threshold force is referred herein as the "strain limited" layer or wall or membrane.

In certain embodiments, the term "strain limiting layer" refers to a layer which is stiffer or less stretchable than the elastomeric body and is attached or secured to the elastomeric body. In one or more embodiments, the strain limited layer is more than about 10%, 20%, 50%, 100%, or 500% stiffer than the elastomeric body.

Although a pressure-actuated soft actuator is described here, vacuum actuated soft actuators that utilized a distributed pneumatics system are also possible and are expressly contemplated. Thus, in other embodiments, the common fluid pressurization channel can be configured to maintain a positive or negative pressure (compared with the atmosphere pressure) for a pre-determined time. In certain embodiments, a vacuum actuated actuator is described comprising an actuation line which is under vacuum and a deactivation line which is at atmospheric pressure or positive pressure for deactivation.

This distributed approach to pneumatic or hydraulic routing addresses at least the three problems identified above for a conventional pressurization and exhaust system, 1) it is no longer necessary to add a tube for addressing each actuation chamber which, assuming a light weight valve assembly is used and air is used as the fluid, will reduce the weight of the tentacle since the pressurization and exhaust tubes are mostly empty; 2) replacing the collection of small diameter tubes used in the conventional pressurization and exhaust system with one or two large-diameter tubes has the effect of reducing tubular resistance and in turn improving the actuation speed of the robot; and 3) the number of independent actuation chambers is no longer limited by the number of tubes that can fit into the tentacles core.

The number of actuation chambers may be limited by the size of the power and communication system used to control the distributed network of valves. Since wires used for powering valves and providing control signals are easily miniaturized, it is now possible to build a tentacle with a much larger number of individually addressable actuation chambers resulting in a more articulated soft robot. In one embodiment, a voltage and ground wire are embedded in the strain limiting core of the soft tentacle which are connected to all of the valves for the purpose of providing power. In certain embodiments, each valve is controlled by its own dedicated small communication wire that may be lithographically deposited on the strain limiting core. In these embodiments, an additional communication wire needs to be added to the robot to control each additional valve that supplies a fluidic chamber. Here, the tether for the soft robotic tentacle would comprise one tube for supplying pressurizing fluid, optionally one tube for exhaust, a voltage wire, a ground wire, and a bundle of communication wires for individually addressing each valve. Since each additional communication wire can have a smaller cross-section than the individual dual purpose pressurization and exhaust tubes used in a conventional soft tentacle, this electronic system still allows for the addition of a larger number of actuation chambers to a soft robotic tentacle than the conventional design.

Alternatively, in other embodiments, a common communication wire or set of communication wires could be connected to the valve assemblies of the robot where individual valve control is accomplished through a communication bus. Many different kinds of communication busses would be appropriate including but not limited to a parallel bus, a serial bus and a 1-Wire bus. In some embodiments, a distributed pressurization and exhaust system that utilizes a communication bus, and each valve in the system would be paired with a microcontroller where all of the microcontrollers are connected to one shared communication wire, or set of shared communication wires. In order to interpret signals from the shared communication wire, or set of shared communication wires, each microcontroller is configured to receive a data word that tells an individual microcontroller if the incoming control signal is intended to command the valve to which the microcontroller is attached. In this way a shared communication wire, or a set of shared communication wires, can be used to control the operation of a collection of valves. In some embodiments, the tether comprises one tube for supplying pressurizing fluid, optionally one tube for exhaust, a voltage wire, a ground wire, and the shared communication wire or set of shared communication wires. Here, the shared communication wire or set of shared communication wires would also be connected to an external microcontroller that is located at the base of the tentacle or outside of the tentacle which is configured to transmit command signals to the robot.

In other embodiments, a nonelectrical wire-based communication system is used for controlling the valves of the robot. For example, in certain embodiments, a fiber optic cable can be used to send an optical control signal to an optically triggered power transistor that gates the supply of power to a valve in the tentacle. In these embodiments, the valve attached to each fluidic chamber would be paired with an optically triggered power transistor to allow the valve to be controlled by signals transmitted through a fiber optic cable. In these embodiments, the tether comprises one tube for supplying pressurizing fluid, optionally one tube for exhaust, a voltage wire, a ground wire, and a set of fiber optic cables where each cable controls a single valve.

Alternatively, a network of valves, each with their own microcontroller, could be connected to a common fiber optic communication cable, or set of fiber optic communication cables, where individual valve control is accomplished via a communication bus. In these embodiments, the tether comprises one tube for supplying pressurizing fluid, optionally one tube for exhaust, a voltage wire, a ground wire, and the shared fiber optic communication cable or set of shared fiber optic communication cables. In other embodiments, communication occurs wirelessly by incorporating a wireless receiver and microcontroller into each valve allowing each valve to receive commands from a wireless transmitter located at the base of the soft robotic tentacle or somewhere external to the soft robotic tentacle. In these embodiments, the tether comprises one tube for supplying pressurizing fluid, optionally one tube for exhaust, a voltage wire, and a ground wire.

In still other embodiments, communication to the valve is achieved via acoustic signal transmission where each valve is paired with either a microcontroller and a piezoelectric sensor or with a piezoelectric triggered power transistor. For example, in some embodiments, a piezoelectric transducer could be used to transmit data down the pressurized fluid inlet line 307 shown in FIG. 3B in the form of pressure waves. These pressure waves could be measured by piezoelectric transducers located in each valve assembly that interpret these oscillations in pressure as data inputs that indicate when to open or close a valve.

Most pneumatic and hydraulic valves are made out of hard components, as a result they would delaminate from their surroundings if they were embedded into the highly deformable surfaces of a soft actuator. In some embodiments, it is for this reason that hard valves would be preferentially located in a strain limiting layer of a soft robot, in a hollow cavity inside a highly deformable surface of a soft robot, or in a hard component of a soft robot.

Alternatively, in other embodiments, the valve is built from flexible and/or soft components/materials. For example, dielectric elastomer actuators could be used to open and close access to pressurizing fluid or exhaust tubes. In the case of these soft valves, a valve can be embedded into a highly deformable surface of a soft robot as well as in a strain limiting surface and in a hard component of a soft robot. In certain embodiments, one can also make non-actuated valve components out of soft materials. For example, one can construct air ways in a soft actuator that use elastomeric membranes to create a quick exhaust valve. In some embodiments, air flow in a specified direction would move an elastomeric membrane in a direction that blocks an exhaust tube and air flow in the opposite direction would move the membrane in a direction that allows access to an exhaust tube.

In some embodiments, the control systems described herein for controlling a distributed pressurization and/or exhaust system require the use of electronics located at the position of each valve in the robot. For these embodiments, conventional hard electronics could be located in a strain limiting layer of a soft robot, in a hollow cavity inside a highly deformable surface of a soft robot, or in a hard component of a soft robot. Alternatively, one could utilize flexible and/or stretchable electronic circuits. Here flexible electronic circuits would preferably be placed in strain limiting surfaces of a robot whereas stretchable circuits could be place in both strain limiting surfaces and highly deformable surfaces.

Figures 4A, 4E:
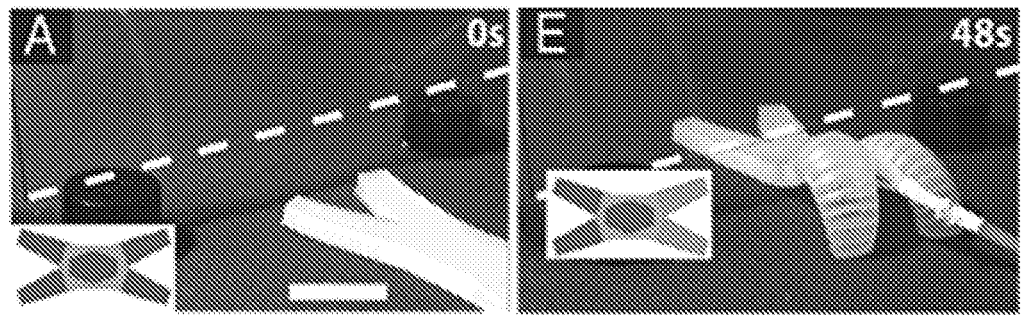
FIGS. 4A-4H show photos of a conventional soft quadruped at different phases of actuation, taken from Whitesides et al., Proc. Natl. Acad. Sci. USA, 108, 20400-20403, 2011.
Figures 4B, 4F:
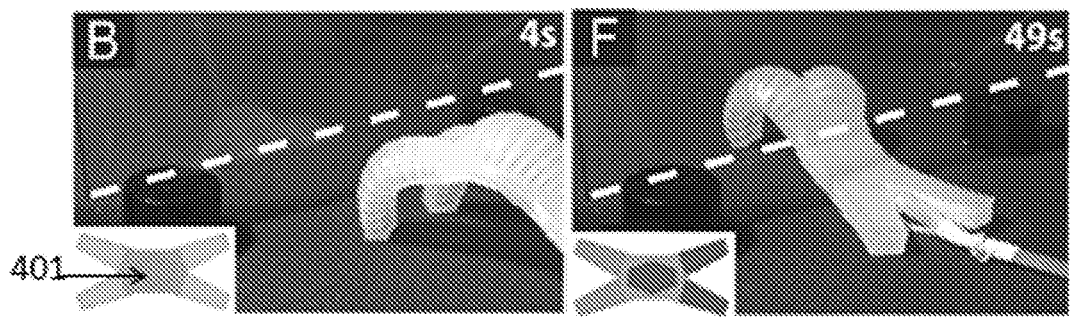
Figures 4C, 4G:
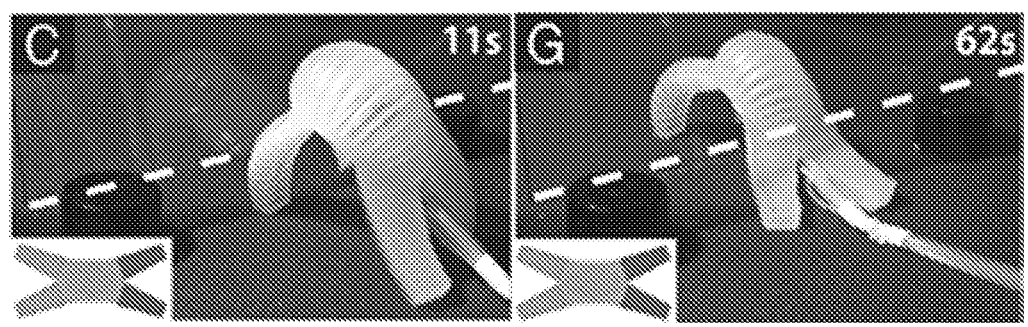
Figures 4D, 4H:
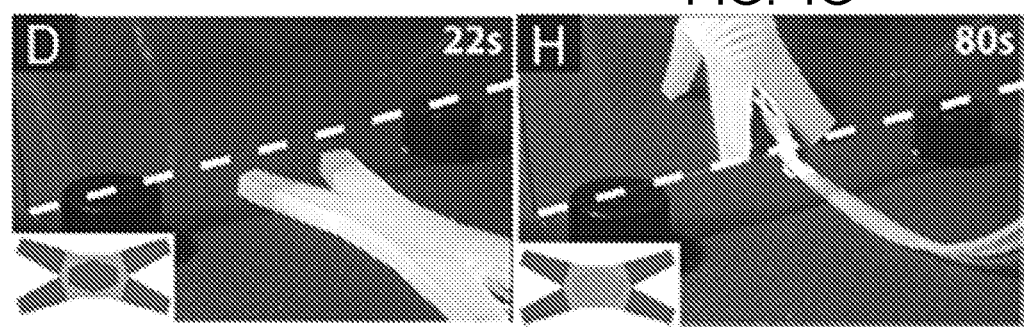

In some embodiments, the distributed pressurization and exhaust system as described herein is a quadruped robot. FIGS. 4A-4H shows photos of a conventional soft quadruped taken from Whitesides et al. *Proc. Natl. Acad. Sci. USA*, 108, 20400-20403, 2011. Specifically, FIGS. 4A-4H show the actuation sequence (the Lower Left insert in each Figure), elapsed time (Upper Right of each Figure), and snapshots of a five chamber soft quadruped robot crawling to a short gap, undulating underneath it, then crawling again on the other side. FIG. 4A shows that the robot starts unpressurized; FIG. 4B shows the central fluid pressurizing channel 401 is pressurized; and FIG. 4C shows that the legs are actuated to crawl toward the gap. FIG. 4D shows that the central channel is depressurized and in FIGS. 4E-4G, the robot is undulated to get under the gap. In FIG. 4H, finally, the central channel is re-pressurized and the robot crawls on the other side of the gap. Actuation chambers pressurized in each step are shown (Inserts) as green; inactive actuation chambers are shown (Inserts) as red; and partially pressurized actuation chambers are shown (Inserts) as orange. The height of the gap is indicated by an overlaid dashed white line. The scale bar is 4 cm.

The use of the distributed pressurization and/or exhaust system described herein in any soft robots is contemplated. Non-limiting examples of soft robots include tethered soft tentacles, tethered soft robotic quadrupeds, soft grippers, soft surgical retractors, soft surgical retractors for laparoscopic surgery, soft endoscopes, untethered soft robotic snakes, untethered soft robotic fish, untethered soft robotic octopus, soft robotic physical rehabilitation devices, soft robotic lanterns, and soft surveillance robots. Additional examples of soft robotic actuators are described in PCT/US2013/066164, filed May 7, 2015, and in PCT/US2013/032297, filed Mar. 15, 2013, the contents of which are expressly incorporated by reference.

In certain embodiments, the soft robot can be a quadruped soft robot. In some embodiments, the quadruped robot includes a distributed pressurization and exhaust systems whose tether contains only one common fluid pressurization channel (or optionally, two large tubes/channels including the common fluid vacuuming channel as shown in FIG. 3B). Like the system shown in FIG. 3B, one common fluid pressurization channel would supply and optionally one common fluid vacuuming channel would exhaust the pressurized fluid for the whole system and actuation of an individual actuation chamber would be controlled by the valve assembly located at the chamber. Just as in the case for the soft tentacle, the use of a distributed pressurization and exhaust system for the soft quadruped can increase the actuation speed of the robot by reducing tubular resistance in the pneumatic tether.

In certain embodiments, in applications where it is permissible to exhaust pressurized fluid at the location of the actuator, one could further simplify the tether by using only one large tube that supplies pressurized fluid to the robot and a series of local valve assemblies and exhaust lines. A soft robot that uses such a system is shown in FIGS. 5A-5B and FIG. 6A-6B.

Figures 5A, 5B:
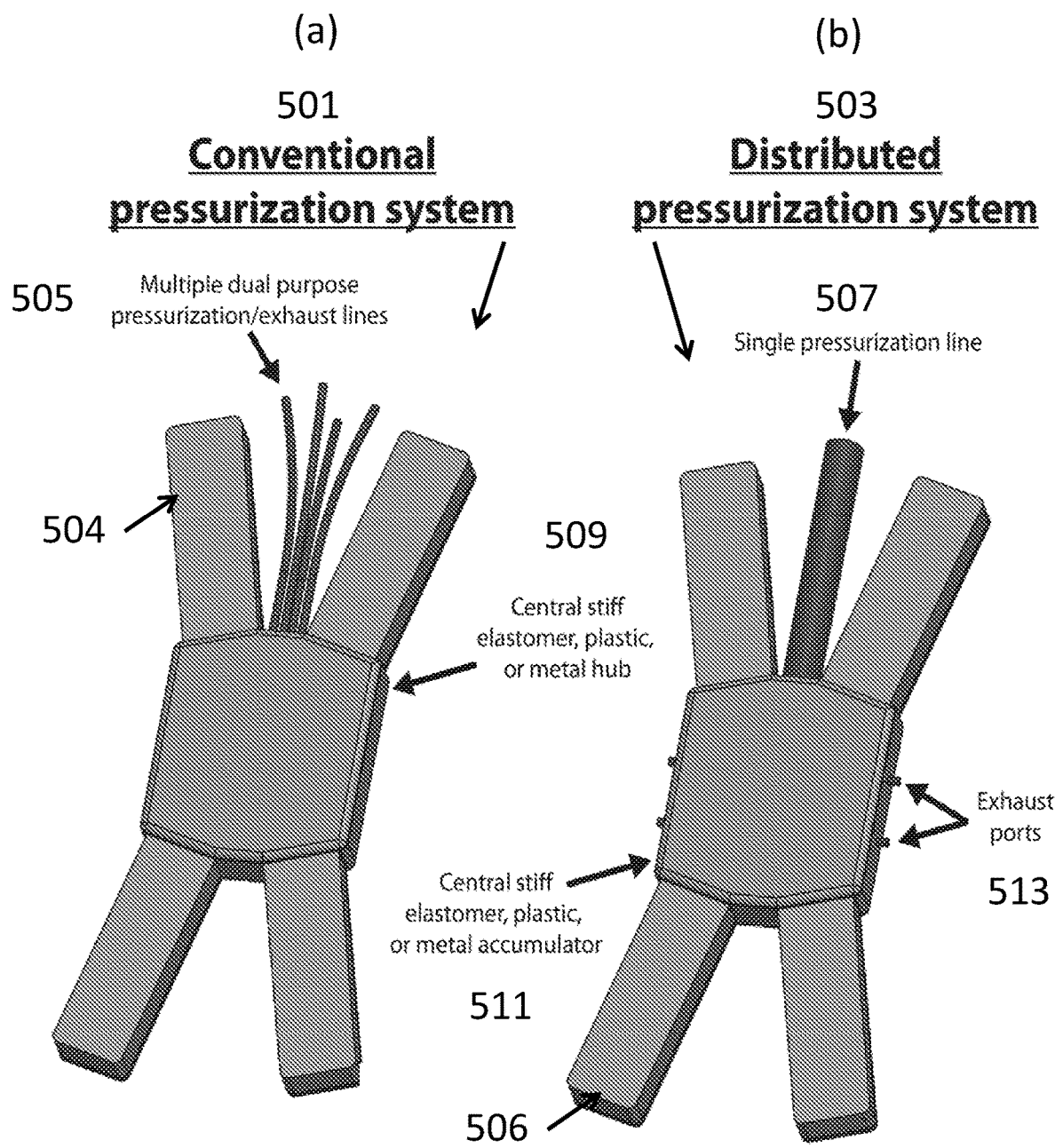
FIG. 5A shows a soft robot with a conventional pressurization and exhaust system including a tether containing four small tubes that are fed into a central stiff hub that holds four soft actuators.
FIG. 5B shows a soft robot with a distributed pressurization and exhaust system, according to one or more embodiments described herein.
Figure 6A:
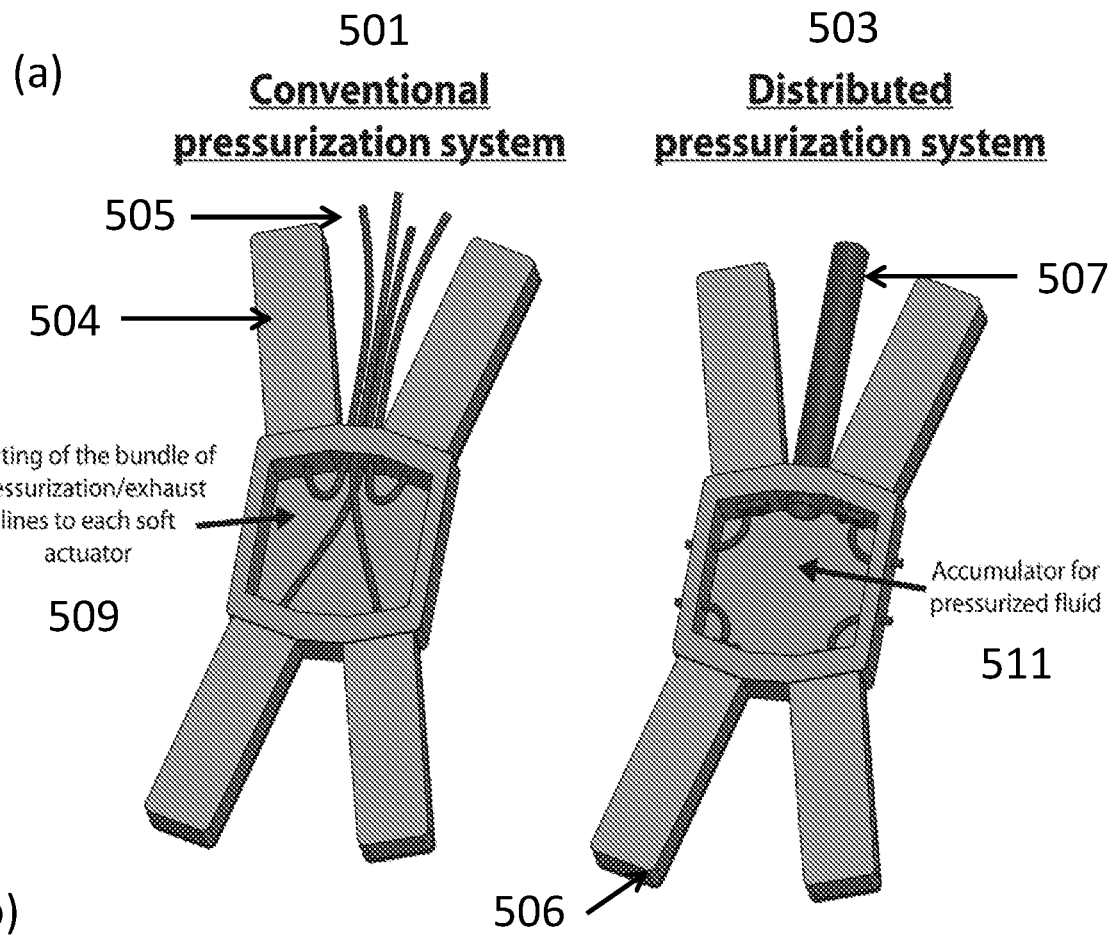
FIG. 6A, left, shows a soft robot with a conventional pressurization and exhaust system wherein the pressurization lines are routed to the four actuators of the robot where each individual tube serves as a supply and exhaust line for a single actuator.
Figure 6B:
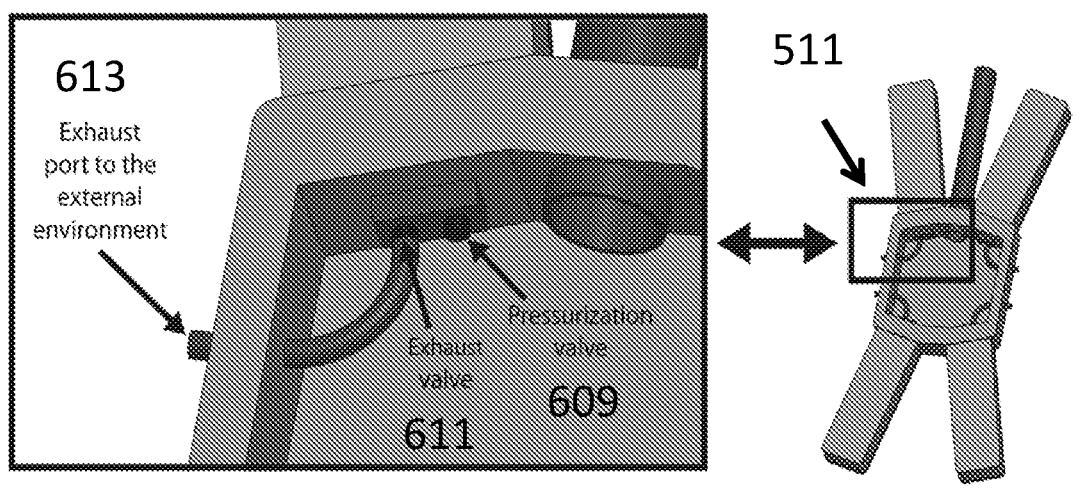
FIG. 6B shows a soft robot with a distributed pressurization and exhaust system including an accumulator having exhaust and pressurization valves, according to one or more embodiments described herein.

In certain embodiments, the common fluid pressurization unit is a common fluid pressurization chamber also known as a pressure accumulator, which is now described with reference to FIGS. 5A-5B. FIGS. 5A-5B and FIGS. 6A-6B show comparisons between a soft robotic quadruped that utilizes a conventional pressurization and exhaust system and one that utilizes a distributed pressurization and exhaust system according to one or more embodiments described herein. In FIG. 5A, a soft robot with a conventional pressurization and exhaust system 501 including a tether containing four small tubes 505 that is connected to four soft actuators 504. In FIG. 6A, left, these tubes 505 are routed to the four actuators 504 of the robot where each individual tube serves as a supply and exhaust line for a single actuator. In contrast, FIG. 5B is an illustration of a soft robot with a distributed pressurization and exhaust system 503 described herein. Unlike the distributed pressurization and exhaust system shown in FIG. 3B which has a common fluid pressurization channel and a common fluid vacuuming channel, this robot contains only a common fluid pressurization channel, i.e., a single pressurization line 507. This is accomplished by replacing the exhaust line used in the robot of FIG. 3B with a series of exhaust channels (e.g., exhaust ports 513) located at each actuator 506 that can vent pressurized fluid from the actuator to the local environment. How this tube routing is accomplished can be seen in FIG. 6A on the right and in FIG. 6B. In these embodiments, the common fluid pressurization chamber is an accumulating chamber (e.g., accumulator 511). Thus, a single pressure supply line 507 is fed into a body at the accumulator 511 which is connected to the actuators 504 and to hold the pressurized fluid for a predetermined time. The pressurized fluid can then enter into any actuator when the valve located at the inlet of that actuator (i.e., pressurization valve 609, FIG. 6B) opens the connection between the accumulator 511 and the actuator 506. Pressurizing fluid in an actuator is vented to the local environment when the exhaust valve 611 opens allowing the fluid to move along a short path out of the body of the robot, via an exhaust channel, e.g., exhaust port 613, to the local environment (FIG. 6B). The design of this distributed pressurization and exhaust system, which contains local exhaust ports attached to each actuator, improves in at least two ways the speed of actuation relative to the distributed pressurization and exhaust system shown in FIG. 3B. First, since the tether no longer requires an exhaust line, a larger pressurization line can be accommodated lowering tubular resistance to actuation. Second, shortening the path over which the exhaust fluid travels before leaving the robotic system also lowers tubular resistance to relaxation of an actuator and improves the speed of actuation. It should be noted that an accumulator is not required for a distributed pressurization and exhaust system design that utilizes only one pressurization line. In certain embodiments, a manifold is placed in the central body of the soft robot for the purpose of dividing the main pressure supply line into a series of smaller lines that would be connected to the pressurization valves of each actuator. Nonetheless, the use of an accumulator is advantageous in certain embodiments. Attaching an actuator either directly or in a short path to a pressure or vacuum accumulator will improve the actuation or relaxation speed of an actuator respectively.

In certain embodiments, the soft robot includes the combination of two or more embodiments of the distributed pressurization and exhaust system as described herein. Choosing between the distributed pressurization and exhaust systems described above or some combination of thereof may depend on the application for which the soft robot is intended. For example, in some embodiments, if a soft gripper is to be used for work on oil drilling equipment on the sea floor, using local exhaust ports would be acceptable since no damage would occur if the air or pressurized sea water used to actuate the robot was vented to the local environment. On the other hand, in other embodiments, if a soft tentacle is to be used for abdominal surgery, venting of pressurized fluid to the local environment could harm the patient. In these embodiments, a distributed pressurization and exhaust system with both a main pressurization line and main exhaust line may be used. In either case, the use of a distributed pressurization and exhaust system will improve the actuation speed of the robot, make it easier to fit more actuators into the body of the robot and in some cases reduce its weight.

Additionally, in certain embodiments, the distributed pressurization and exhaust systems architectures are used in untethered robots. Reducing tubular resistance, reducing weight, and allowing for more actuators in the body of a robot are desirable. As a result, these same distributed-network designs that place valve assemblies, accumulators and exhaust ports near actuators and utilize larger supply and exhaust tubes for pressurized fluid will also have applications to improve the functionality of untethered soft robotic systems.

Thus, in certain embodiments, the pressurization line may be omitted from the soft robot and instead a pneumatic pump may be included in the robot. In some embodiments, the pneumatic pump is attached to the pressure accumulator at the center of the robot. One additional advantage of this design is that the pump could be set to constantly "top off" the accumulator so there is always air available for running the robot. This is in contrast with the "Resilient, Untethered Soft Robot" where the pump is used to directly fill soft actuators upon actuation and only utilized intermittently. In this new distributed design described herein, the pump can be running anytime the accumulator pressure has dropped below some set "filled" pressure. Since the pump can now be potentially running continuously creating a constant supply of pressurized air in the accumulator, the rate of actuation is no longer restricted by the flow rate of the on-board pump but instead by the flow rate of air moving from the accumulator into the fluid chambers, e.g., the actuators.

In other embodiments, a vacuum source, e.g., a vacuum pump, may be included in the robot. In these embodiments, the pressurization line may be omitted from the soft robot. In some embodiments, the vacuum source is attached to the accumulator at the center of the robot. One additional advantage of this design is that the pump could be set to constantly running to maintain certain level of vacuum in the accumulator. Since the pump can now be potentially running continuously creating a constant vacuum, the rate of actuation is no longer restricted by the flow rate of the on-board vacuum pump but instead by the flow rate of air moving to the accumulator from the fluid chambers, e.g., the actuators.

In other embodiments, the soft robot comprise an on board pressurized fluid source, e.g., a pressure pump and a vacuum source, e.g., vacuum pump. Here, the on board pressure pump would supply fluid, e.g., air, pressure to the pressurized accumulator (used for actuating the soft actuators) and the vacuum pump would be attached to the vacuum accumulator (used for rapidly de-actuating the soft actuators).

The soft robot may contain or be connected to a fluid inflation or deflation source, which is optionally external to the soft robot. The fluid inflation or deflation source can be any apparatus that inflates and/or deflates the fluid. Non-limiting example of the fluid inflation or deflation sources include a gas pump, a gas vacuum, a gas pump and vacuum, a liquid pump, a liquid-suction pump, or a liquid pump and suction pump. In some embodiments, the soft robot is connected directly to the fluid inflation/deflation source. The use of any fluid, gas or liquid, is contemplated, including air, gas, water, oil, liquid metal. A non-limiting example of the gas is air. The use of other gases is contemplated.

In certain embodiments, the fluid is gas and the fluid inflation/deflation source is an optional external gas inflation/vacuum source. The external gas inflation source may be a pump, gas cylinder, liquefied gas cylinder, or balloon. The external vacuum source may be a vacuum pump. Any other gas inflation source and vacuum source known in the art are contemplated.

In another aspect, a method of actuating a soft robot is described, the method including:
providing a soft robot according to any one of the embodiments described herein;
providing pressurized fluid into the common pressurizing unit; and
activating one or more pressurizing valves to allow the pressurized fluid to flow from the common fluid pressurization unit into at least one of the fluid chambers to result in actuation.

In some embodiments, the method may further include removing fluid from the pressurizing unit.

In yet another aspect, a method of actuating a soft robot is described, the method including:
providing a soft robot according to any one of the embodiments described herein;
removing fluid from the common fluid pressurization unit; and
activating one or more pressurizing valves to remove the fluid from the fluid chamber to result in actuation.

In some embodiments, the method further includes transmitting acoustic signals to trigger the actuation the soft robot. The acoustic signals can be used as a way to transmit data where the signal is generated by a device such as a piezoelectric. In some embodiments, the method further includes transmitting acoustic signals by actuating the soft robot. In some embodiments, one or more pressurizing valves are opened by acoustic signals.

Many different valves or combinations of valves can potentially be used in a distributed pneumatic system described herein for a soft robot. The list below provides some examples but is not a limiting set of possible valve choices.

Example 1

The application of pressure and the exhausting of fluid from a soft actuator could be performed by a set of two "Two Way, Two Position" (2W/2P) valves. In a 2W/2P valve the valve can be in two states: 1) the valve blocks the flow of fluid between the inlet and outlet of the valve and 2) the valve allows air to flow between the inlet and outlet of the valve. In this case one 2W/2P valve would be used to control the supply of pressurizing fluid to an actuator and a second 2W/2P valve would be used to control the exhausting of fluid from the actuator. It should be noted that in this and in other examples the exhaust tube could either be at a lower pressure than the pressurization tube or in cases where it is desirable to expedite the exhausting of pressurizing fluid the exhaust tube could be part of a vacuum system that holds the pressure of the tube below atmospheric pressure.

Example 2

Since it is typical to either pressurize an actuator or exhaust pressurizing fluid from an actuator a single valve can be used whose two states provide either 1) pressurizing fluid or 2) exhaust. In these cases one would use a single "Three Way, Two Position" (3W/2P) valve. In a 3W/2P valve the valve can be in two states:
1) the valve allows fluid flow between the tube that supplies pressurizing fluid and the inlet tube to the actuator and 2) the valve allows fluid flow between the exhaust tube and the inlet tube to the actuator.

Example 3

In some cases it is desirable to have the ability to hold the actuator in a fixed position by maintaining a static pressure. In these cases one needs to block fluid flow in or out of the actuator. This can be accomplished using two 2W/2P valves as described above or it can be accomplished using a single "Three Way, Three Position" (3W/3P) valve. In this case the valve would have three states: 1) the valve allows the flow of fluid between the inlet tube to the actuator and the tube that supplies pressurizing fluid, 2) the valve allows the flow of fluid between the inlet tube to the actuator and the tube that exhausts the actuator, and 3) the valve blocks the flow of fluid between all tubes. Here the third state would be the one that holds the actuator at a static pressure.

Example 4

Another way to control an actuator is to use a single "Two Way, Two Position" (2W/2P) valve in conjunction with a "Quick Exhaust Valve" (QEV). This setup would have two states: 1) the 2W/2P valve allows fluid to flow from the pressurizing tube through the 2W/2P valve, through the QEV, and next into the actuator and 2) the 2W/2P valve blocks the flow of pressurizing fluid to the QEV and as a result fluid flows backwards from the actuator to the QEV and then exits the system by flowing out of the exhaust port of the QEV.

It should be noted that the valves described here can be controlled either electronically or they can be pneumatically or hydraulically piloted. Since pressurizing fluid used to pilot a valve needs to be transported to the valve via a fluid handling line this method of valve control requires the incorporation of additional tubes into the body of the soft robot. It is for this reason that pneumatically or hydraulically piloted valves are not preferred. In contrast wires used to provide power and control signals to a valve can be smaller than fluid handling lines and are readily incorporated into the bodies of soft machines, as a result electronically controlled valves are preferred when making soft robots which utilize a distributed pressurization and exhaust system.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

We claim:

1. A soft robot comprising:
 a flexible and/or stretchable body;
 a common fluid pressurization unit; and
 a plurality of fluid chambers each embedded in the flexible and/or stretchable body in fluidic connection with the common fluid pressurization unit through a pressurizing valve;
 wherein the pressurizing valve is configured for activation by flow of the pressurized fluid from the common fluid pressurization unit into the fluid chamber to result in actuation.

2. The soft robot of claim 1, wherein the common fluid pressurization unit is embedded in the flexible and/or stretchable body.

3. The soft robot of claim 1, wherein the common fluid pressurization unit is a common fluid pressurization channel.

4. The soft robot of claim 1, wherein the common fluid pressurization unit is a common fluid pressurization chamber.

5. The soft robot of claim 1, wherein the pressurizing valve is connected to the common fluid pressurization unit via a connection tube.

6. The soft robot of claim 1, wherein the common fluid pressurization unit is configured to be in fluidic connection with a pressurized fluid source.

7. The soft robot of claim 1, wherein the common fluid pressurization unit is configured to be connected to a vacuum source.

8. The soft robot of claim 1, wherein the common fluid pressurization unit is configured to maintain a positive or negative pressure compared with atmosphere for a predetermined time.

9. The soft robot of claim 1, further comprising a common fluid exhaust unit and each of the fluid chambers is capable of being in fluidic connection with the common fluid exhaust unit through an exhaust valve.

10. The soft robot of claim 9, wherein the common fluid exhaust unit is a common fluid exhaust channel or a common fluid exhaust chamber.

11. The soft robot of claim 1, wherein one or more fluid chambers further each comprise an exhaust valve and an exhaust channel; wherein the fluid chamber is configured to be in fluidic connection with outside environment through the exhaust valve and exhaust channel.

12. The soft robot of claim 1, wherein the common fluid pressurization unit is an accumulating chamber capable of being in fluidic connection with the plurality of fluidic chambers through the pressurizing valves.

13. The soft robot of claim 12, wherein the accumulating chamber is stiff, flexible, or stretchable.

14. The soft robot of claim 12, wherein the accumulating chamber is configured to hold a pressurized fluid to be filled into the fluid chambers and/or to exhaust the pressurized fluid from the fluid chambers.

15. The soft robot of claim 12, wherein the accumulating chamber is an accumulator in fluidic communication with the pressurizing valves.

16. The soft robot of claim 15, wherein the accumulating chamber is an accumulator attached to or embedded in the flexible and/or stretchable body.

17. The soft robot of claim 1, further comprising one or more communication wires connected to one or more of the pressurization valves to control the valves collectively or individually.

18. The soft robot of claim 17, wherein the wire is conventional wire or lithographically deposited wire.

19. The soft robot of claim 17, wherein one or more of the pressurization valves are linked with a microcontroller connected to one or more communication wires.

20. The soft robot of claim 17, wherein the one or more wires are connected to one or more of the pressurization valves to perform valve control via a communication bus.

21. The soft robot of claim 1, further comprising one or more fiber optic cables each connected to one or more of the pressurization valves and configured to perform valve control.

22. The soft robot of claim 1, further comprising one or more fiber optic cables each connected to one or more of the pressurization valves and configured to perform valve control via a communication bus.

23. The soft robot of claim 1, wherein one or more of the pressurization valves each comprise an electric system configured to allow a user to control the pressurization valves wirelessly.

24. The soft robot of claim 1, further comprising an optically-triggered transistor or an acoustically-triggered transistor configured to control the operation of one or more of the pressurization valves.

25. The soft robot of claim 1, further comprising one or more piezoelectric transducers to transmit signal to control the pressurization valves.

26. The soft robot of claim 1, wherein the pressurizing valve is a main valve.

27. The soft robot of claim 26, wherein the soft robot further comprises one or more pilot valve each in fluidic connection with the main valve(s) and configured to actuate the main valve(s).

28. The soft robot of claim 27, wherein the soft robot comprise a first accumulating chamber fluidically connected to the main valve(s) and a second accumulating chamber fluidically connected to the pilot valve(s).

29. The soft robot of claim 28, wherein the first accumulating chamber is fluidically connected via a regulator and a valve to the second accumulating chamber.

30. The soft robot of claim 28, wherein the first and/or second accumulating chambers are connected to the main valve and the pilot valve, respectively, through a regulator and a valve.

31. The soft robot of claim 30, wherein the first accumulating chamber comprises fluid with a pressure higher than the fluid in the fluid chamber.

32. The soft robot of claim 27, wherein the main valve is configured to operate at a first pressure; and the pilot valve is configured to operate at a second pressure higher than the first pressure.

33. The soft robot of claim 1, wherein the flexible body comprises a strain limiting layer, wherein a tensile modulus of the strain limiting layer is higher than a tensile modulus of the flexible and/or stretchable body.

34. The soft robot of claim 1, further comprising a fluid reservoir and a fluid inlet.

35. The soft robot of claim 1, further comprising a fluid reservoir and a fluid inlet and wherein the fluid reservoir is configured to deliver fluid via the fluid inlet into the common fluid pressurization channel.

36. The soft robot of claim 1, wherein the flexible and/or stretchable body is made from an elastomer.

37. The soft robot of claim 1, wherein the soft robot further comprises a pneumatic pump and/or vacuum pump.

38. A method of actuating a soft robot, the method comprising:
providing a soft robot according to claim 1;
providing pressurized fluid in the common fluid pressurization unit; and
activating one or more pressurizing valves to allow the pressurized fluid to flow from the common fluid pressurization unit into at least one of the fluid chambers to result in actuation.

39. The method of claim 38, further comprising removing fluid from the pressurizing unit.

40. The method of claim 38, further comprising transmitting acoustic signals to trigger the actuation.

41. The method of claim 38, wherein one or more pressurizing valves are configured to be opened by acoustic signals.

42. A method of actuating a soft robot, the method comprising:
providing a soft robot according to claim 1;
removing fluid from the common fluid pressurization unit; and
activating one or more pressurizing valves to remove the fluid from the fluid chamber to result in actuation.

43. The method of claim 42, further comprising transmitting acoustic signals to trigger the actuation.

44. The method of claim 42, wherein one or more pressurizing valves are configured to be opened by acoustic signals.

* * * * *